(12) United States Patent
Warden et al.

(10) Patent No.: US 8,764,203 B1
(45) Date of Patent: Jul. 1, 2014

(54) TARGET ASSEMBLY SYSTEM AND METHOD

(71) Applicant: Brunson Instrument Company, Kansas City, MO (US)

(72) Inventors: Adam John Warden, Lee's Summit, MO (US); Larry Dean Guyton, Independence, MO (US)

(73) Assignee: Brunson Instrument Company, Kansas City, MO (US)

( * ) Notice: Subject to any disclaimer, the term of this patent is extended or adjusted under 35 U.S.C. 154(b) by 0 days.

(21) Appl. No.: 13/933,880

(22) Filed: Jul. 2, 2013

Related U.S. Application Data

(63) Continuation of application No. 12/819,058, filed on Jun. 18, 2010, now Pat. No. 8,474,989, which is a continuation-in-part of application No. 12/612,565, filed on Nov. 4, 2009, now abandoned.

(60) Provisional application No. 61/111,243, filed on Nov. 4, 2008.

(51) Int. Cl.
*G02B 5/12* (2006.01)

(52) U.S. Cl.
USPC .......................................................... 359/515

(58) Field of Classification Search
CPC ...... G01C 11/00; G01C 15/02; G01C 15/006; G02B 5/122
USPC .................................................. 359/515, 516
See application file for complete search history.

(56) References Cited

U.S. PATENT DOCUMENTS 5,073,005 A * 12/1991 Hubbs ........................... 359/515

* cited by examiner

*Primary Examiner* — Euncha Cherry
(74) *Attorney, Agent, or Firm* — Kutak Rock LLP; Bryan P. Stanley

(57) ABSTRACT

A target system and method for photogrammetry using a target holder is provided with a body including a flat face surface and an annular protruding lip extending upward from the surface around the perimeter of the body. Target paper is positioned on the surface and cut to size on the surface leaving a centered circle of target paper.

16 Claims, 5 Drawing Sheets

TARGET ASSEMBLY SYSTEM AND METHOD

CROSS-REFERENCE TO RELATED APPLICATIONS

This application is a continuation to co-pending U.S. application Ser. No. 12/819,058, filed Jun. 18, 2010, which is a continuation-in-part to U.S. application Ser. No. 12/612,565, filed Nov. 4, 2009 and which claims priority pursuant to 35 U.S.C. 119(e) to U.S. Provisional Patent Application Ser. No. 61/111,243, filed Nov. 4, 2008, the entire disclosures of which are incorporated herein by reference.

BACKGROUND OF THE INVENTION

1. Field of the Invention

The present general inventive concept relates to a target system and method to be used in photogrammetry, and in one particular embodiment, to a target holder having an aperture at least partially therethrough to precisely position a target assembly therein for use in determining geometric properties of an object. In another embodiment, the general inventive concept relates to a target holder including an annular protruding rim and a generally flat surface for placement of a target piece (such as a target paper material). In still another embodiment, the general inventive concept relates to a method of placing a target piece on a target holder.

2. Description of the Related Art

A large number of industries require precise and accurate measuring for a number of applications such as production, manufacturing, and process control. In many such applications, measurement errors on the order of even one ten-thousandth of an inch can be critical. Instruments such as laser trackers, scanners, associated targets and the like are particularly well suited for such applications because they provide extreme precision and accuracy.

Retro-reflective photogrammetric target systems have been designed, such as the system disclosed by U.S. Pat. No. 5,073,005, the entire disclosure of which is incorporated herein by reference, for precise measurement application. Nevertheless, the target structure of U.S. Pat. No. 5,073,005 provides significant challenges during manufacturing, as minor imprecision during the assembly of a single component (such as a mask over a reflective material of the target) can result in significant inaccuracy of the target during usage. Therefore, it would be desirable to provide a target structure that can be assembled with less possibility of resulting in inaccuracies of the target during usage.

SUMMARY OF THE INVENTION

The present general inventive concept provides an improved target system and method to be used in photogrammetry. In one particular embodiment the general inventive concept provides a target holder having an aperture therethrough to precisely position a target assembly therein for use in determining geometric properties of an object. In another embodiment, the general inventive concept relates to a target holder including an annular protruding rim and a generally flat surface for placement of a target piece. In still another embodiment, the general inventive concept relates to a method of placing a target piece on a target holder.

The present general inventive concept further provides a target assembly with improved accuracy.

The present general inventive concept further provides a target assembly that protects a target piece by recessing the target piece into the target assembly.

The present general inventive concept further provides, in a preferred embodiment, a target assembly with elements that magnetically engage each other thereby eliminating the need to handle elements that are sensitive to touch such as reflective paper.

The present general inventive concept further provides, in a preferred embodiment, a target assembly having a flat disk to receive a removable target piece.

The present general inventive concept further provides a target paper that is attached to a flat disk via an adhesive, static, and/or magnetic attachment means.

The present general inventive concept further provides, in a preferred embodiment, a target having a mask that is attached by means that prevent creep or other undesired movement of the mask, which overcomes the problem of traditional vinyl masks that are attached by an adhesive that results in eventual creep and inaccuracy of the target.

The present general inventive concept further provides, in a preferred embodiment, a target assembly having a flat disk to support a target paper that is made of a material other than vinyl and preferably made from paper to yield a crisp, clean edge about a circumference of the target paper.

The present general inventive concept further provides, in a preferred embodiment, a target assembly having a plug or flat disk to support a target paper, the flat disk being insertably mounted into a target holder such that the flat disk face and target paper are slightly recessed into the target holder from a face surface of the target holder to protect the target paper from fingerprints, debris, and the like.

The present general inventive concept further provides, in a preferred embodiment, a plug or flat disk to support a target paper, the flat disk having a magnetic cover to magnetically engage the flat disk for the purpose of trapping the target paper between the magnetic cover and the flat disk thereby protecting and/or securing the target paper.

The present general inventive concept further provides, in a preferred embodiment, a target system having an easily removable target assembly design to ensure correct positioning and accuracy of a target.

The present general inventive concept further provides, in a preferred embodiment, a target assembly having a plug or target body that can be removed from a hole in the target system such that the target body can be disassembled to replace one or more pieces of the target body such as a target paper if it becomes worn or damaged, and then reassembled and installed back into the target system in the exact same pre-removal position thereby ensuring accuracy of the target assembly.

The present general inventive concept further provides, in a preferred embodiment, a target system having a target assembly with a tubular base that is insertable into a receiver and rotatable therein.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a target system having a elongated body with an aperature at an upper end opposite to a insertable stand lower end, the aperture sized and shaped to accommodate a ring therein, the ring sized and shaped to accommodate a disk therein, the disk having a surface to mount a target.

The foregoing and other objects are intended to be illustrative of the present general inventive concept and are not meant in a limiting sense. Many possible embodiments of the present general inventive concept may be made and will be readily evident upon a study of the following specification and accompanying drawings comprising a part thereof. Various features and subcombinations of present general inventive concept may be employed without reference to other features and subcombinations. Other objects and advantages of this present general inventive concept will become apparent from the following description taken in connection with the accompanying drawings, wherein is set forth by way of illustration and example, an embodiment of this present general inventive concept.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
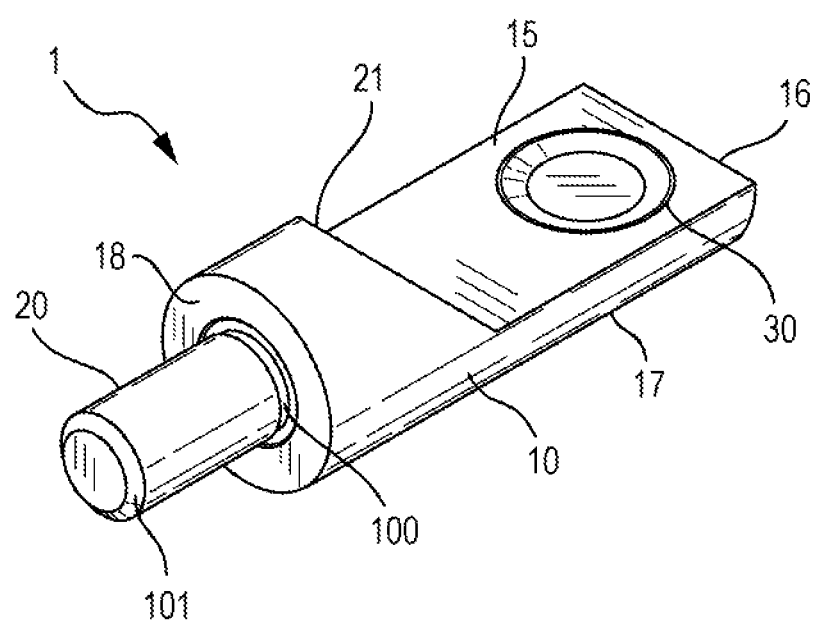
FIG. 1 is a front elevation view of an embodiment of the present general inventive concept illustrating an assembled target system.
Figure 2:
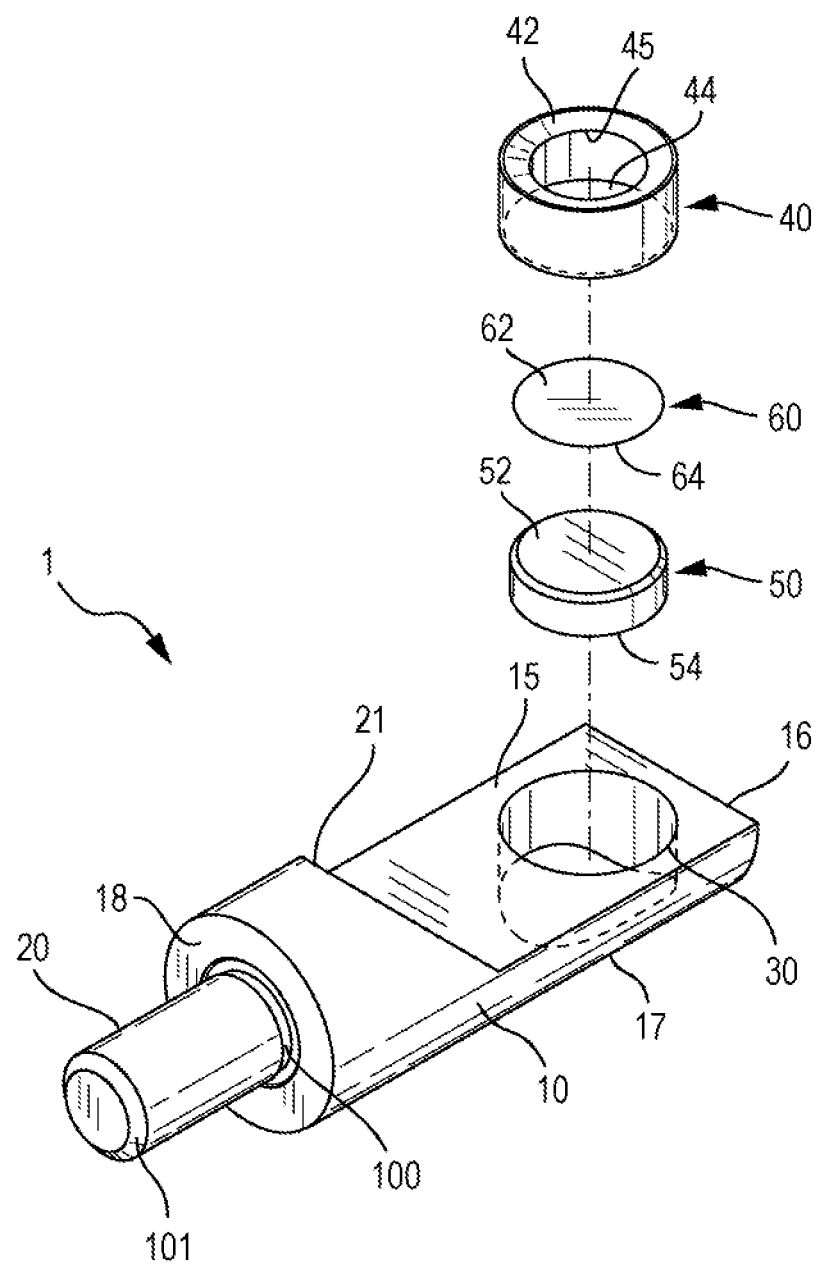
FIG. 2 is an exploded cross view of embodiment of FIG. 1 illustrating a target system with target assembly including a target disc support, a target perimeter ring, and a target adhesive piece.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As illustrated in FIG. 1, a target system 1 includes an elongated body 10 with a flat face surface 15 adjacent to a top surface 16, a convex rear surface 17 opposite to the face surface 15 that extends from the top surface 16 to a lower surface 18, and a base 20 extending from the lower surface 18.

The elongated body 10 is generally tubular except for the face surface 15 that is machined therein. An intermediate portion 21 subtly connects the face surface 15 to the generally tubular elongated body 10.

A circular aperture 30 extends through the face surface 15 to the rear surface 17 and is sized and shaped to accommodate a target perimeter ring 40.

The target perimeter ring 40 has a front surface 42 and a rear surface 43 with a cavity 44 therein. The cavity 44 is opened at an end adjacent to the front surface 42 to receive a disc 50 and has an abutment surface with aperture therein. In the exemplary embodiment, the perimeter ring 40 is magnetic and the disc 50 is metal such that the two elements may be easily assembled without additional connection means. It is foreseen, however, that the perimeter ring 40 and/or disc 50 may be made of other like materials such as plastic, metal etc., and may be assembled within aperture 30 using glue, epoxy, welding, etc.

The disc 50 is circular and has a flat face surface 52 and an opposite-facing rear surface 54. The flat face surface 52 is sized and shaped to receive a target paper 60.

The target paper 60 is circular and has a textured front surface 62 and an adhesive back surface 64, the adhesive back surface 64 provided to facilitate attachment of the target paper 60 to the disk 50 face surface 52.

In use, the target paper 60 back surface 52 is adhered to the face surface 52 of the disc 50. The perimeter ring 40 is inserted into the body 10 by sliding the front surface 42 through the aperture 30 from the rear surface.

Once the perimeter ring 40 is installed, the disc 50 is inserted into the cavity 44 by sliding the face surface 52 into the cavity 44 until the target paper 60 abuts an interior of the cavity 45.

In another embodiment, the disc 50 is inserted into the body 10 first, then glued or otherwise attached within the aperture 30 and then target paper 60 is adhered to face surface 52 of the disc 50. The ring 40 is then installed and glued, or other wise attached, in place within the aperture 30.

Figure 3:
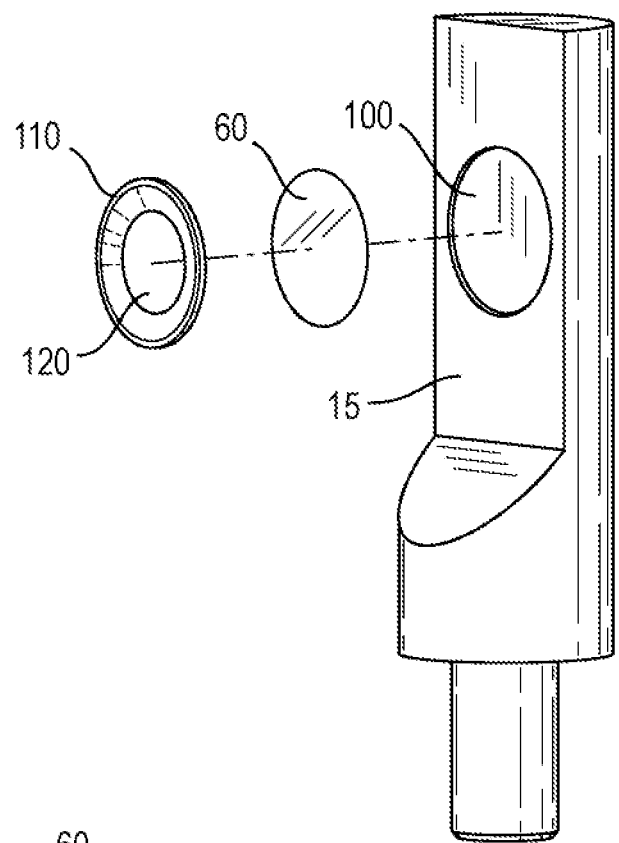
FIG. 3 is a perspective view of an embodiment of the present general inventive concept illustrating an exploded target system.

In another embodiment, as illustrated by FIG. 3, the circular aperture 30 may be replaced with simply a recessed portion 100 such that the target paper 60 nests within the recessed portion 100. Additionally, the target paper 60 may be covered by a circular plate 110 having an aperture 120 therethrough. The circular plate 110 fits tightly within the recessed portion 100. In this manner, the target paper 60 abuts both a rear surface of the recessed portion 100 and the circular plate 110, and the circular plate 110 acts to secure the target paper 60 within the recessed portion 100.

Figure 4:
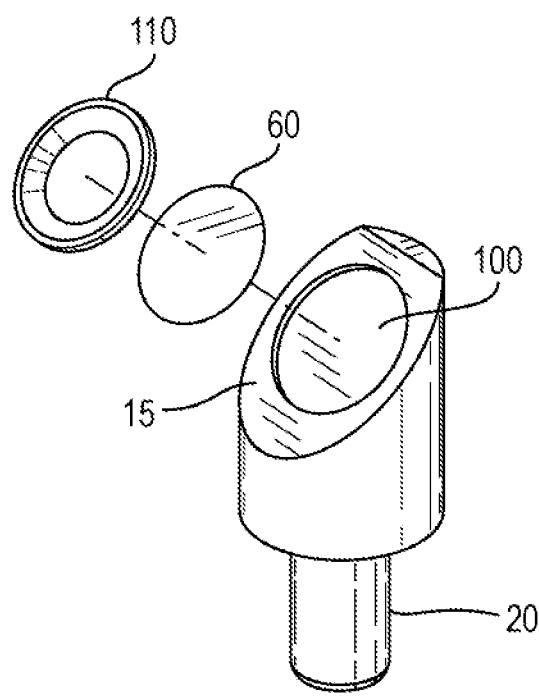
FIG. 4 is a perspective view of an embodiment of the present general inventive concept illustrating an exploded target system.
Figure 5:
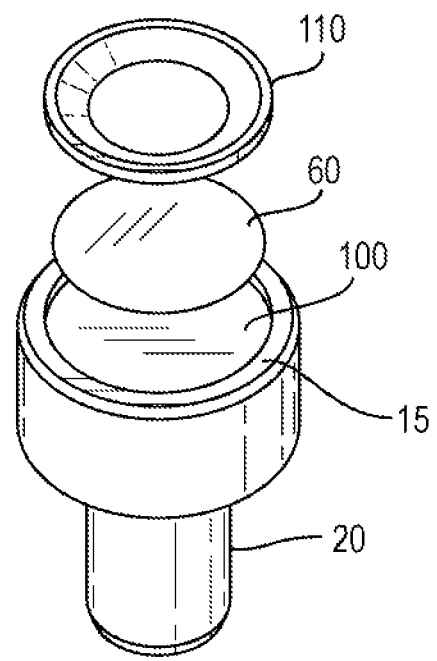
FIG. 5 is a perspective view of an embodiment of the present general inventive concept illustrating an exploded target system.

While the face surface 15 of the above embodiments extends at zero degrees with respect to the base 20, it is foreseen that the face surface 15 may extend at other various angles including but not limited to forty-five degrees, as illustrated by FIG. 4, or ninety degrees, as illustrated by FIG. 5, with respect to the base 20. In these embodiments, the target paper 60 nests within the recessed portion 100 and may be covered by the circular plate 110 having an aperture therethrough. The circular plate 110 fits tightly within the recessed portion 100 such that the target paper 60 abuts both a rear surface of the recessed portion 100 and the circular plate 110. In this manner, the circular plate 110 acts to secure the target paper 60 within the recessed portion 110.

Figure 6:
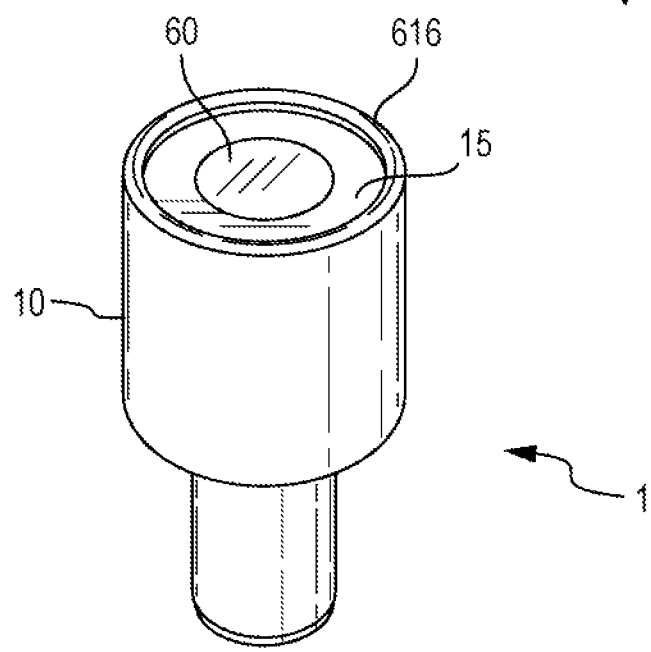
FIG. 6 is a perspective view of another embodiment of a target system of the present general inventive concept.
Figure 7:
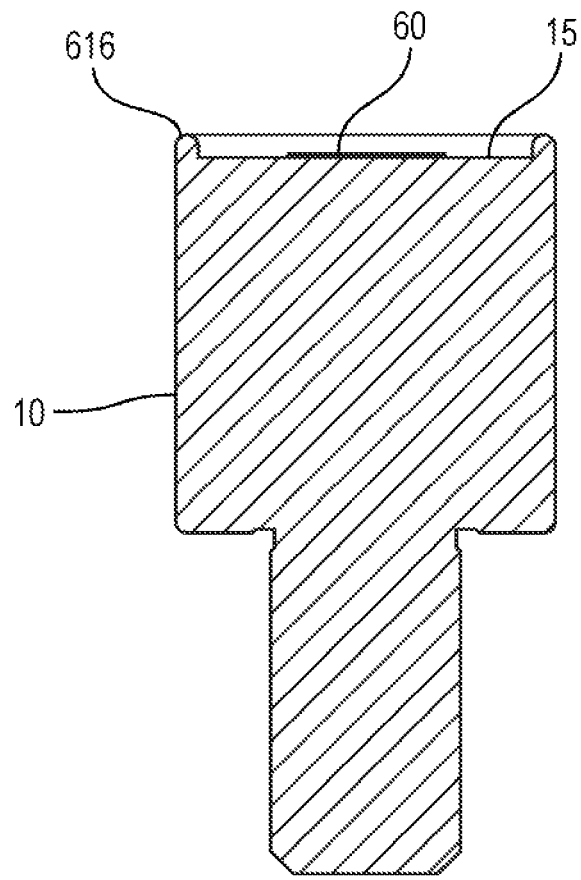
FIG. 7 is a front sectional view of the target system of FIG. 6.

Referring to FIGS. 6 and 7, another embodiment of the inventive concept is shown in which target system 1 includes a generally cylindrical body 10 with a flat face surface 15 that is also the top surface of the body 10. The flat face surface 15, of the embodiment shown in FIGS. 6 and 7, is surrounded by an annular protruding lip 616 that extends upward from the surface around the perimeter of the body 10. Target paper 60 is adhered to face surface 15. In a preferred embodiment, target paper 60 is sized to cover approximately the entire surface of face 15. A lathe and razor blade is then used to cut a circle having a diameter less than the diameter of face surface 15 at the center of face surface 15. The excess material of target paper 60 is removed from around the perimeter of the central circle, leaving a centered circle of target paper 60 as is shown in FIG. 6.

It will be appreciated that although body 10 is shown in the embodiment of FIGS. 1-5 as generally elongated, and in the embodiment of FIGS. 6 and 7 as generally cylindrical, that the shape of the body 10 of any embodiment of the instant inventive concept may be elongated, cylindrical, or any other shape desired without departing from the spirit and scope of the instant inventive concept.

Although a few embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A target mounting system for a retroreflective target, the system comprising:
   a body having an upper portion with a flat face surface;
   an annular protruding lip in the form of an annulus, extending upward from said flat face surface around a perimeter of said body; and
   a target paper positioned on said flat face surface.

2. The target mounting system according to claim 1, wherein said body is made of a metallic material.

3. The target mounting system according to claim 1, wherein said target paper is sized to cover approximately an entirety of said flat face surface, and a portion of said target paper is removed from a perimeter thereof.

4. The target mounting system according to claim 3, wherein said portion of said target paper is removed by cutting a circle having diameter less than a diameter of said flat face surface.

5. The target mounting system according to claim 4, wherein said cutting utilizes a lathe and razor blade.

6. The target mounting system according to claim 4, wherein said cut circle is concentric with said flat face surface.

7. The target mounting system according to claim 3, wherein said target paper is adhered to said flat front surface prior to said removal of said portion of said target paper.

8. The target mounting system according to claim 1, wherein said body is generally cylindrical.

9. The target mounting system according to claim 1, wherein said body is generally elongated.

10. The target mounting system according to claim 1, wherein said flat face surface is a top surface of said body.

11. The target mounting system according to claim 1, wherein the target paper is glued to said flat face surface.

12. A target mounting system for a retroreflective target, the system comprising:
   a body having an upper portion with a flat face surface;
   an annular protruding lip extending upward from said flat face surface; and
   a target paper positioned on said flat face surface;
   wherein said target paper is sized to cover approximately an entirety of said flat face surface, and a portion of said target paper is removed from a perimeter thereof.

13. The target mounting system according to claim 12, wherein said portion of said target paper is removed by cutting a circle having diameter less than a diameter of said flat face surface.

14. The target mounting system according to claim 13, wherein said cutting utilizes a lathe and razor blade.

15. The target mounting system according to claim 13, wherein said cut circle is concentric with said flat face surface.

16. The target mounting system according to claim 12, wherein said target paper is adhered to said flat front surface prior to said removal of said portion of said target paper.

* * * * *